United States Patent [19]

Widmer et al.

[11] Patent Number: 4,768,492
[45] Date of Patent: Sep. 6, 1988

[54] MARINE PROPULSION SYSTEM WITH FUEL LINE COOLER

[75] Inventors: Steven L. Widmer, Oshkosh, Wis.; Gerald F. Neisen, Merritt Island, Fla.; Jeffrey P. Ruhnke; Thomas J. Steffes, both of Fond du Lac, Wis.; Brian S. Buchholz, North Fond du Lac, Wis.

[73] Assignee: Brunswick Corporation, Skokie, Ill.

[21] Appl. No.: 2,309

[22] Filed: Jan. 9, 1987

[51] Int. Cl.[4] ............................................. F02M 31/20
[52] U.S. Cl. .................................... 123/541; 123/41.31
[58] Field of Search ...................... 123/540, 541, 41.31, 123/41.44; 440/88, 89, 900; 24/20 TT, 20 EE, 16 PB; 285/197, 423

[56] References Cited

U.S. PATENT DOCUMENTS

| Re. 26,400 | 6/1968 | Jasper | 123/41.31 |
|---|---|---|---|
| 2,466,440 | 4/1949 | Kiekhaefer | 418/154 |
| 2,791,186 | 5/1957 | Alden | 123/41.31 |
| 3,541,786 | 11/1970 | Sarra | 60/310 |
| 3,835,822 | 9/1974 | Mickle et al. | 123/41.31 |
| 3,859,951 | 1/1975 | Woodfill | 440/112 |
| 4,220,121 | 9/1980 | Maggiorana | 123/41.8 |
| 4,294,470 | 10/1981 | Tucker | 285/197 |
| 4,306,614 | 12/1981 | Maggiorana | 123/41.8 X |
| 4,372,011 | 2/1983 | Aranyos | 24/20 TT |
| 4,392,779 | 7/1983 | Bloemers et al. | 415/141 |
| 4,491,117 | 1/1985 | Koide | 123/541 |
| 4,504,238 | 3/1985 | Neisen | 123/41.08 X |
| 4,514,106 | 4/1985 | Slager | 285/197 |

FOREIGN PATENT DOCUMENTS 0106123   6/1983   Japan ................................ 123/41.31

Primary Examiner—Willis R. Wolfe
Assistant Examiner—M. Macy
Attorney, Agent, or Firm—Andrus, Sceales, Starke & Sawall

[57] ABSTRACT

A fuel line cooler (34) is provided for a marine propulsion system (2) having a water cooled internal combustion engine (4) in a heat retentive compartment (5). The fuel line cooler (34) has an inlet (36) in communication with the source (14, 12) of cooling water for the engine (4), and has an outlet (38) for discharging water. The fuel line cooler (34) is cooled by sea water during running of the engine (4). Upon turn off of the engine (4), the cooled water in the fuel line cooler (34) is in heat transfer relation with the fuel and prevents vaporization and or spewing of the fuel.

7 Claims, 6 Drawing Sheets

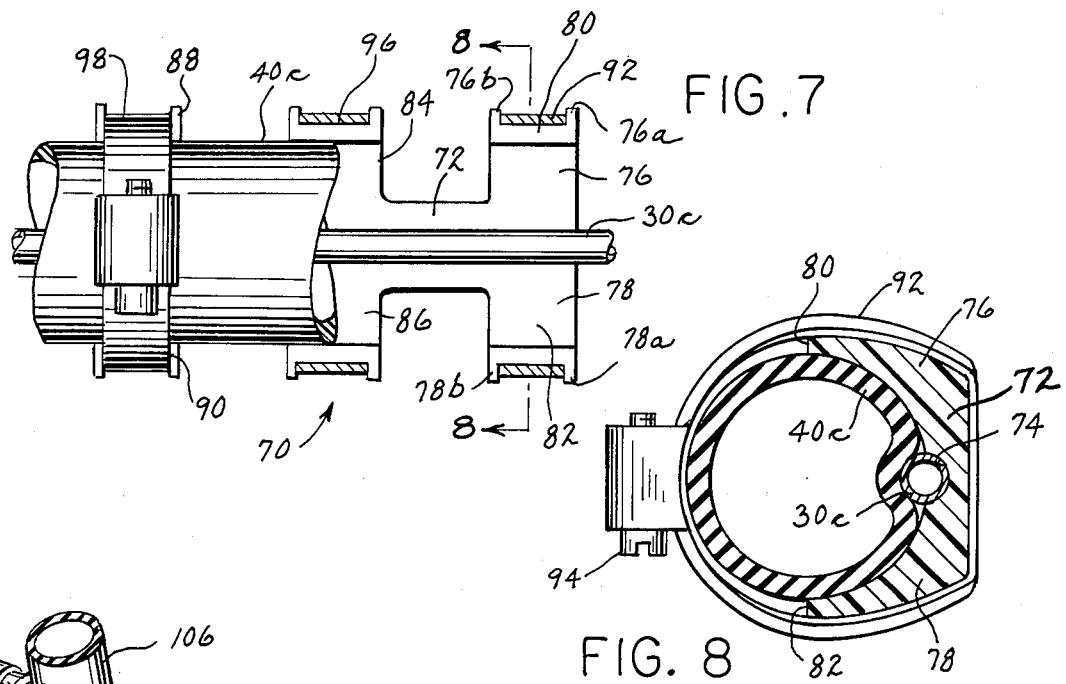
FIG. 7
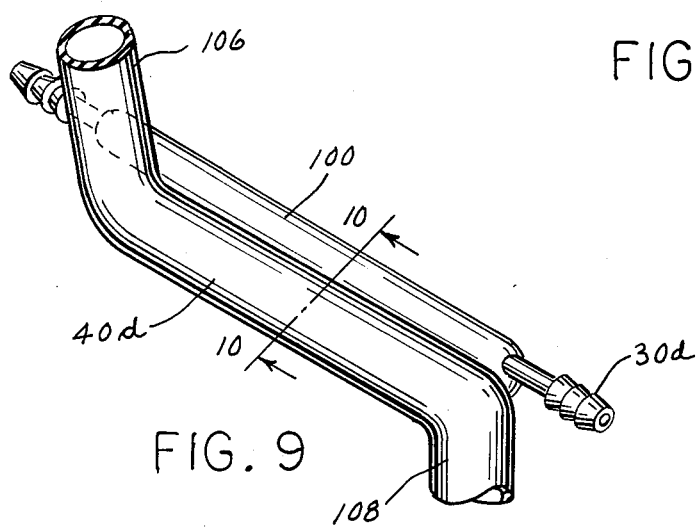
FIG. 8
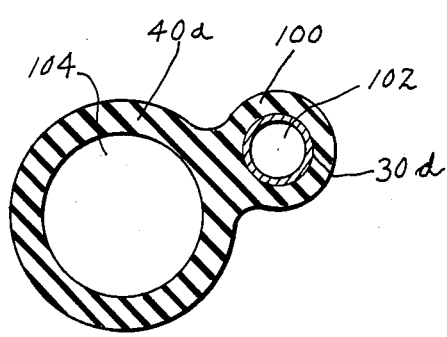
FIG. 9
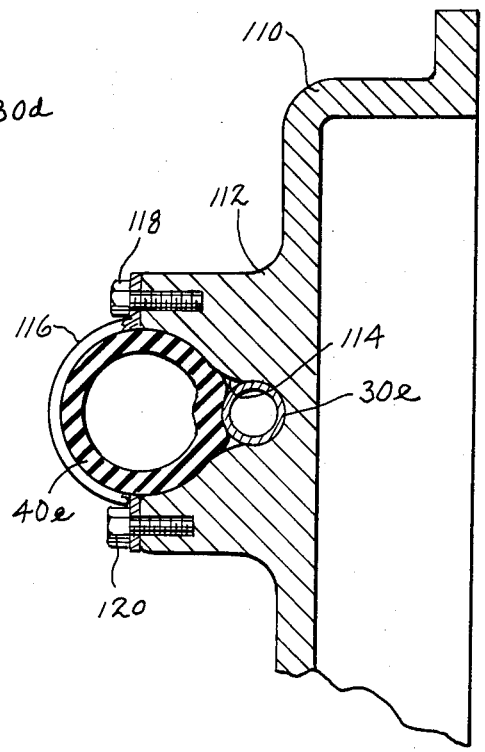
FIG. 10
FIG. 11

MARINE PROPULSION SYSTEM WITH FUEL LINE COOLER

BACKGROUND AND SUMMARY

The invention arose during development efforts relating to a marine propulsion system having an engine in a closed or heat-retentive compartment causing problems of vapor lock, and or spewing.

After the engine is turned off, the temperature in the closed heat-retentive compartment in a marine propulsion system continues to rise. The fuel line and fuel pump are no longer cooled by the flow of incoming fuel from the cooler fuel tank. The stagnant fuel sitting in the fuel line and the fuel pump will begin to vaporize and or boil as the fuel line and fuel pump continue to heat up.

It is known in the prior art to provide insulation around the fuel lines to isolate the fuel from the heat.

The present invention addresses and solves the above noted fuel vaporization problem by providing a thermally inertial mass which is actively cooled during running of the engine, and which prevents vaporization of the fuel after the engine is turned off. A fuel line cooler in the compartment is in heat transfer relation with the fuel line and has an inlet communicating with the source of cooling water for the engine and has an outlet for discharging water. During running of the engine, water is circulated through the fuel line cooler. After the engine is turned off, the cooled water in the fuel line cooler provides the noted thermally inertial mass to prevent vaporization of the fuel.

BRIEF DESCRIPTION OF THE DRAWINGS

FIG. 7 shows a further embodiment of a fuel line cooler in accordance with the invention.

FIG. 8 is a sectional view taken along line 8—8 of FIG. 7.

FIG. 9 shows a further embodiment of a fuel line cooler in accordance with the invention.

FIG. 10 is a sectional view taken along line 10—10 of FIG. 9.

FIG. 11 shows a further embodiment of a fuel line cooler in accordance with the invention.

DETAILED DESCRIPTION

Figure 1:
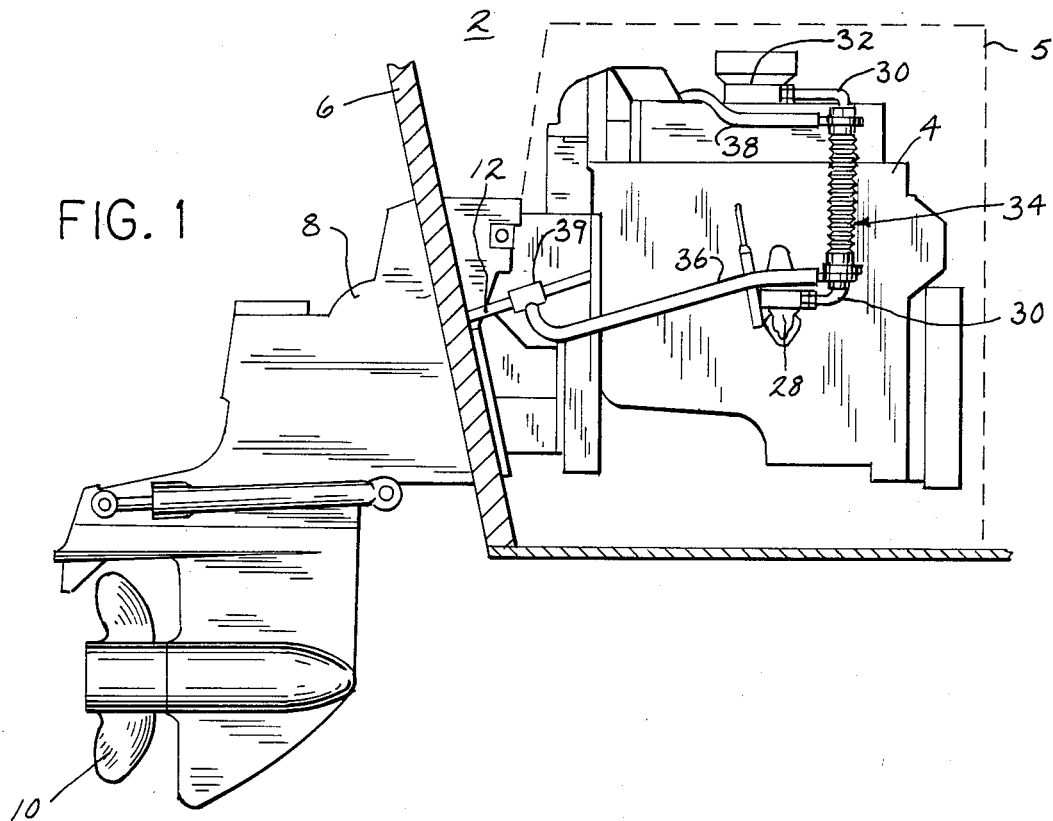
FIG. 1 shows a marine propulsion system with a fuel line cooler in accordance with the invention.
Figure 2:
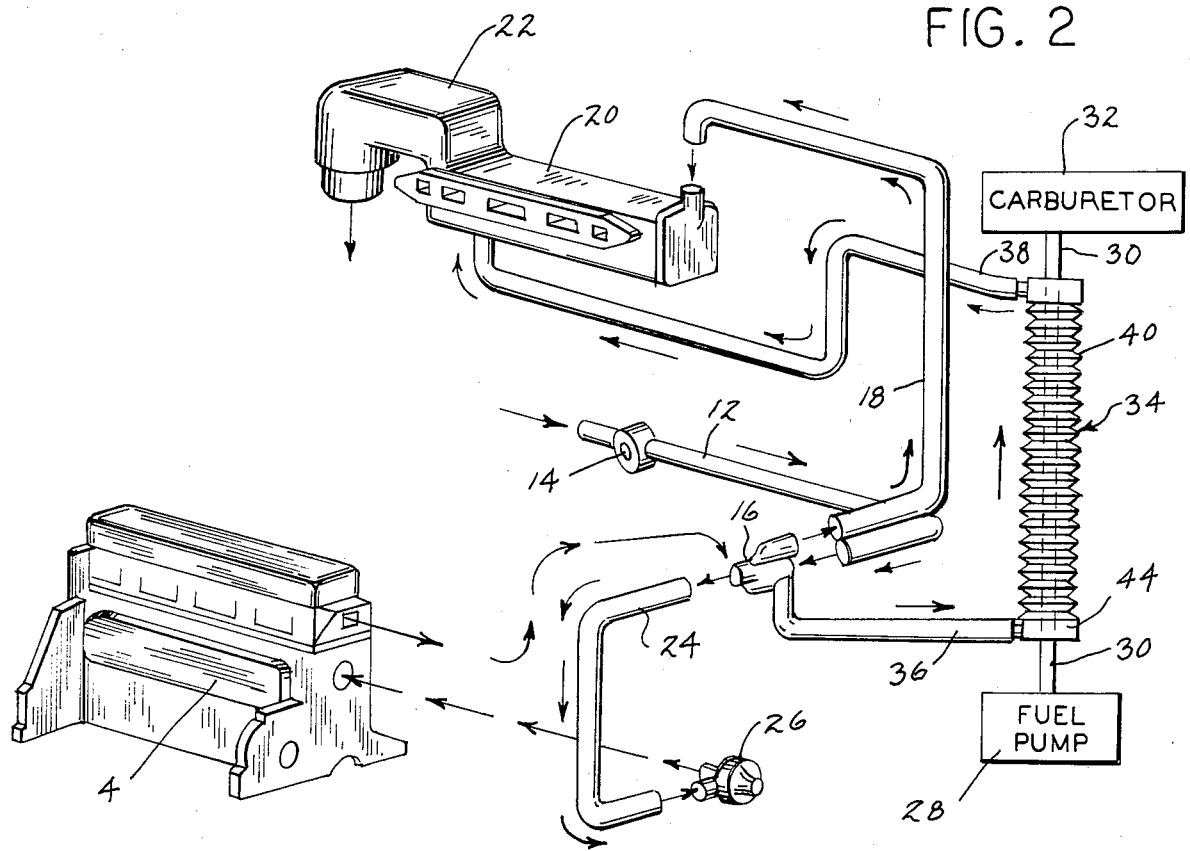
FIG. 2 is an exploded isometric view of a portion of the system in FIG. 1.

FIG. 1 shows a marine propulsion system 2 including an inboard engine 4 in a closed heat-retentive compartment 5 and drivingly connected through the boat transom 6 to stern drive 8 for rotating propeller shaft 10. The stern drive has a water outlet 12 for supplying cooling water to the engine. This cooling water is supplied by a sea water pickup pump 14, FIG. 2, for which further references may be had from Kiekhaefer U.S. Pat. No. 2,466,440 and Bloemers et al U.S. Pat. No. 4,392,779, incorporated herein by reference. A portion of FIG. 2 is taken from the Mercruiser "Service Training Notebook" 90-90593 4-985, page 127, and shows a Mercury Marine MCM 120 engine with standard cooling. In such standard cooling embodiment, sea water from pickup pump 14 is supplied through water line 12 to thermostat housing 16. When the engine is cold, the water from input line 12 first fills the engine and then is diverted by thermostat 16 to output line 18 which in turns supplies the water to exhaust manifold 20 and exhaust elbow 22. The exhaust elbow discharges the water with the products of combustion, for which further reference may be had from Sarra U.S. Pat. No. 3,541,786, incorporated herein by reference. When the engine warms sufficiently, cooling water from inlet 12 flows through thermostat 16 to passage 24 and is then circulated by engine circulating pump 26 through engine 4. Fuel pump 28 pumps fuel from a remote tank (not shown) and delivers the fuel through fuel line 30 to fuel distribution means such as carburetor 32 for supplying fuel for combustion.

In accordance with the invention, a fuel line cooler 34 has an inlet 36 communicating with the source of cooling water for the engine, and has an outlet 38 for discharging water. Inlet 36 is a water hose which may be connected to line 12 by means of a T-fitting 39, FIG. 1, or to thermostat housing 16 upstream of the thermostat valve therein, FIG. 2, or various other connections for providing the cooling water. Though a standard cooling system is shown providing sea water as the cooling water for the engine, the invention is of course applicable to systems where sea water is provided to a heat exchanger through which engine cooling water is circulated, commonly known as a closed cooling system. Outlet 38 is connected to exhaust manifold 20, though may be connected to water passage 18, or to other outlets for discharging the water, or directly discharged overboard. Sea water pickup pump 14 supplies cooling sea water for both engine 4 and fuel line cooler 34. Fuel line cooler 34 is between fuel pump 28 and carburetor 32 and cools the fuel line downstream of fuel pump 28. Alternatively or additionally, cooling water from inlet 36 may be provided to a water cooled fuel pump, for example Mickle et al U.S. Pat. No. 3,835,822 and Alden U.S. Pat. No. 2,791,186, incorporated herein by reference.

Figure 3:
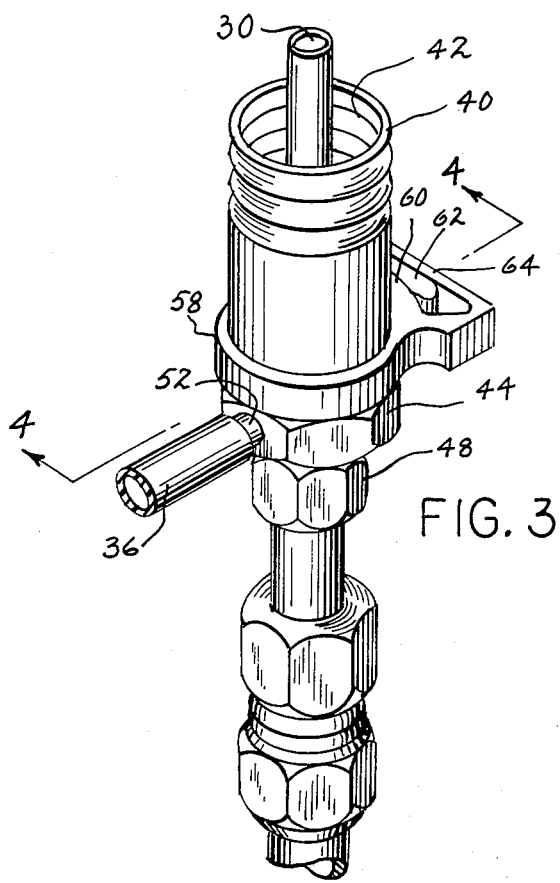
FIG. 3 is an isometric view of a portion of the fuel line cooler of FIGS. 1 and 2.
Figure 4:
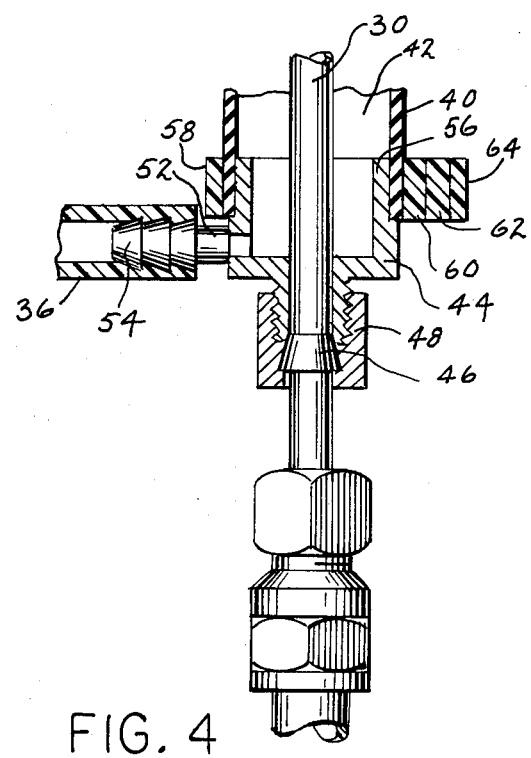
FIG. 4 is a sectional view taken along line 4—4 of FIG. 3.

Fuel line cooler 34 includes a water hose 40, FIGS. 2-4, concentric to fuel line 30 and defining an annular space 42 through which cooling water flows in direct contact with the exterior surface of fuel line 30. The inlet includes water hose 36 connected to fitting 44. A compression ring 46 around fuel line 30 is compressed in sealing relation by a compression nut 48 around fuel line 30 and tightened to threaded fitting 44 to which water hose 40 is clamped. Fitting 44 has an inlet port 52 which is exteriorly barbed at 54 to receive and retain water hose 36 communicating therethrough with annular space 42. Fitting 44 has an exterior hex configuration for tightening to hex nut 48. Fitting 44 also has a slightly reduced outside diameter portion 56 for receiving water hose 40 and clamped by a hose clamp or by a plastic clip 58 as provided by a press-on clamp with mating serrated barbed fingers 60 and 62 and retained by outer finger 64, such as an SNP 24 clamp. The outlet at 38 is comparable. Water hose 40 is a bellows-type hose axially expandable along the direction of fuel line 30 and enabling selective placement of inlet 36 and outlet 38 along the fuel line to selectively control the length of the fuel line to be cooled. Concentric axially expandable bellows hose 40 selectively enables cooling of substantially the entire fuel line between fuel pump 28 and carburetor 32, or cooling of only a portion of such fuel line by spacing one or both of the inlet 36 and outlet 38 from its respective end of the fuel line between fuel pump 28 and carburetor 32.

Figure 5:
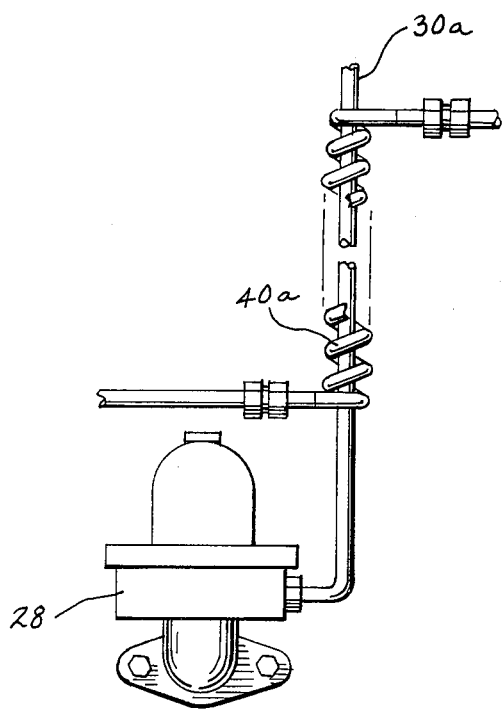
FIG. 5 shows a further embodiment of a fuel line cooler in accordance with the invention.

FIG. 5 shows an alternate embodiment and uses like reference numerals from the above figures where appropriate to facilitate clarity. The fuel line cooler is provided by a water hose 40a wound in a helical coil around fuel line 30a such that cooling water flowing through helical coil hose 40a cools the hose which in turn cools the fuel line.

Figure 6:
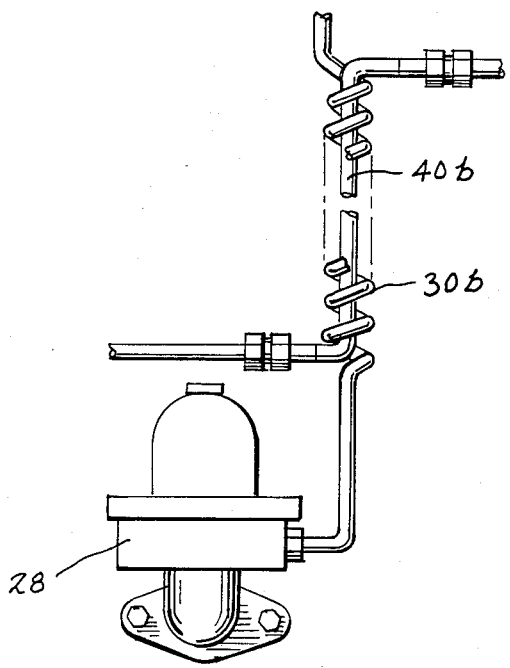
FIG. 6 shows a further embodiment of a fuel line cooler in accordance with the invention.

FIG. 6 shows another embodiment and like reference numerals are used from the above figures where appropriate to facilitate clarity. The fuel line cooler includes a water hose 40b. The fuel line 30b is wound in a helical coil around water hose 40b.

FIGS. 7 and 8 show another embodiment and like references numerals are used from the above figures where appropriate to facilitate clarity. The fuel line cooler includes a clamp 70 clamping water hose 40c into heat transfer relation with fuel line 30c. Water hose 40c is clamped into direct heat transfer contact with fuel line 30c, FIG. 8, in parallel side-by-side relation. Clamp 70 has a central elongated shank 72 extending axially along the direction of fuel line 30c and having an axial locating groove 74 for receiving the fuel line. A first pair of opposing jaws 76 and 78 extend oppositely radially from central shank 72 and partially around water hose 40c and terminate at respective jaw ends 80 and 82. A second pair of jaws 84 and 86 are axially spaced from the first pair of jaws 76 and 78 and extend oppositely radially from central shank 72 and partially around water hose 40c. A third pair of jaws 88 and 90 are axially spaced from the second pair 84 and 86 and extend oppositely radially from central shank 72 and partially around water hose 40c. A hose clamp 92 is placed around water hose 40c and guided by outer shoulders 76a, 76b and 78a, 78b on jaws 76 and 78 and tightened by hose clamp screw 94. Hose clamps 96 and 98 are likewise provided around their respective jaws for clamping to the water hose.

FIGS. 9 and 10 show another embodiment and use like reference numerals from the above figures where appropriate to facilitate clarity. A rubber hose 100 has a fuel passage 102 therethrough for either receiving fuel directly or receiving fuel line 30d. Rubber hose 100 is affixed to water hose 40d, for example by vulcanizing. Alternatively, hose 100 and hose 40d are integrally molded rubber having a figure eight shaped configuration in cross section, FIG. 10, with one of the loops of the figure eight defining a water passage 104, and the other of the loops of the figure eight defining a fuel passage 102. Only a portion of water hose 40d need extend contiguously along integral with or affixed to hose 100, and other sections of the water hose may continue to respective inlet and outlet ports, for example as shown at water hose sections 106 and 108.

FIG. 11 shows another embodiment and uses like reference numerals from the above figures where appropriate to facilitate clarity. A portion of the flywheel housing 110 for a stern drive on the inboard side of the transom is shown. This housing section is formed with an extra upstanding base member portion 112 having a groove 114 therein receiving fuel line 30e and water hose 40e. A cap member 116 is mounted by bolts 118 and 120 to base member 112 and holds water hose 40e and fuel line 30e in heat transfer relation. Groove 114 is generally V-shaped, and fuel line 30e is in the bottom of the groove and water hose 40e directly contacts fuel line 30e. The profile of water hose 40e is higher than the outer edge of the V-shaped groove 114, and cap member 116 is curved around over the top of water hose 40e.

Figure 12:
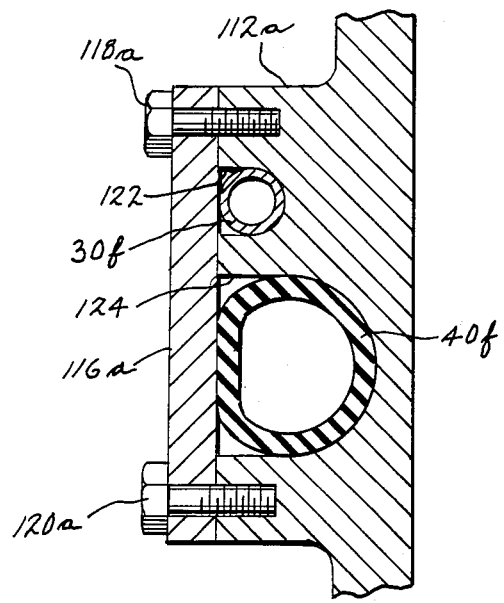
FIG. 12 shows a further embodiment of a fuel line cooler in accordance with the invention.

FIG. 12 shows another embodiment and uses like reference numerals from the above figures where appropriate to facilitate clarity. Base member 112a is similar to base member 112 and has a first groove 122 providing a fuel passage 124 for directly receiving fuel or for receiving fuel line 30f, and has a second groove 124 providing a water passage directly receiving water or receiving water hose 40f. Cap member 116a is mounted to base member 112a by bolts 118a and 120a and closes fuel passage 122 and retains fuel line 30f therein, if present, and closes water passage 124 and retains water hose 40f therein if present. Fuel line 30f is spaced and separate from water hose 40f by the material of base member 112a. Heat transfers between the fuel passage and the water passage through the base member material.

Figure 13:
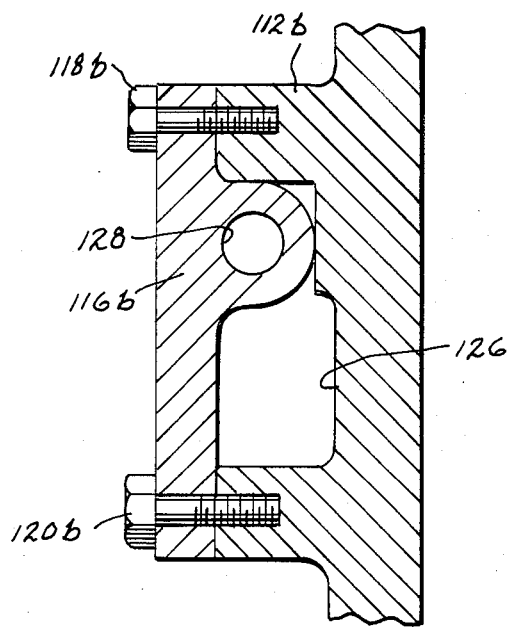
FIG. 13 shows a further embodiment of a fuel line cooler in accordance with the invention.

FIG. 13 shows another embodiment and uses like reference numerals from the above figures where appropriate to facilitate clarity. Base member 112b has a groove 126 providing a water passage directly receiving water or receiving the water hose. Cap member 116b is mounted to base member 112b by bolts 118b and 120b and has a fuel passage 128 for directly receiving the fuel or receiving the fuel line. Fuel passage 128 and water passage 126 are spaced and separated by the material of cap 116b, and heat transfers therebetween through the cap material.

Figure 14:
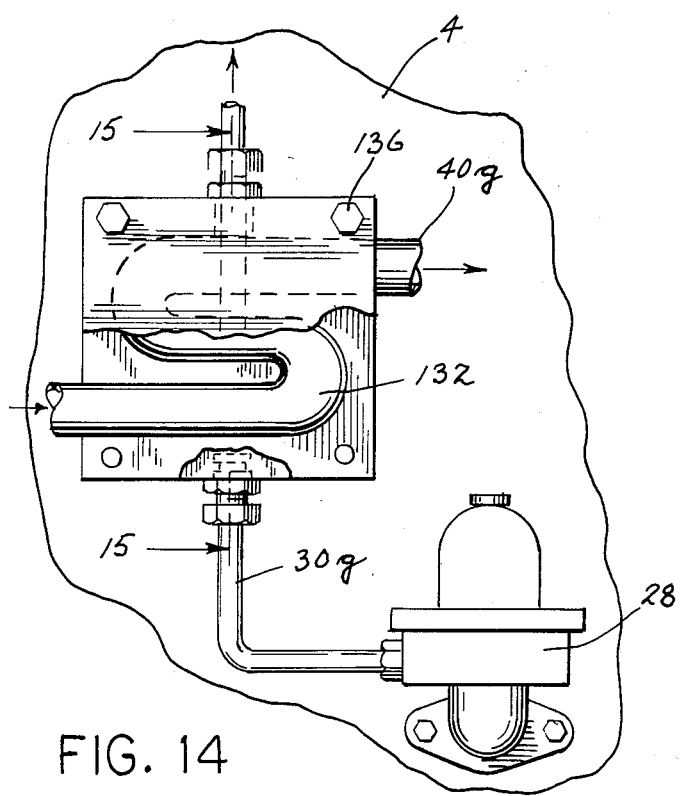
FIG. 14 shows a further embodiment of a fuel line cooler in accordance with the invention.
Figure 15:
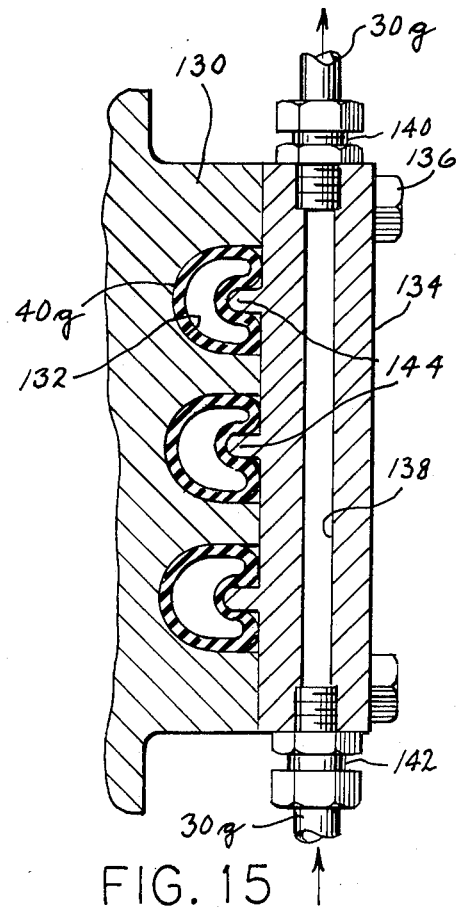
FIG. 15 is a sectional view taken along line 15—15 of FIG. 14.

FIGS. 14 and 15 show another embodiment and use like reference numerals from the above figures where appropriate to facilitate clarity. The side of engine block 4 has a raised base member 130 integrally formed therewith. Base member 130 has a serpentine S-shaped exposed groove 132 therein for receiving water hose 40g. A cap member 134 is mounted by bolts such as 136 to base member 130 and has a fuel passage 138 therethrough with threaded fittings 140 and 142 at its ends for connection to fuel line 30g. Cap 134 has a plurality of finger projections such as 144 extending into groove 132 along different portions of the serpentine path and deforming water hose 40g in a general C-shaped configuration, FIG. 15. Water hose 40g and fuel passage 138 are spaced by the material of cap 134 for heat transfer therethrough, with increased surface contact area provided by fingers 144.

Figure 16:
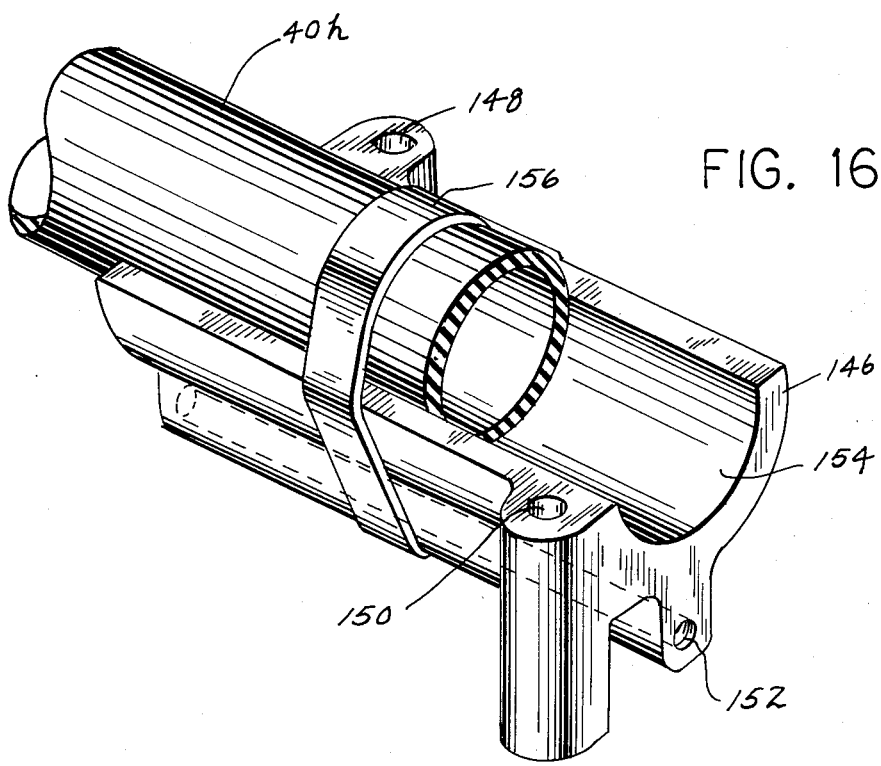
FIG. 16 shows a further embodiment of a fuel line cooler in accordance with the invention.

FIG. 16 shows another embodiment and uses like reference numerals from the above figures where appropriate to facilitate clarity. A cast housing 146 is bolted to the engine block or fly wheel housing through bolt or stud receiving apertures such as 148 and 150. Housing 146 has a fuel passage 152 therethrough with threaded ends for attachment to the fuel line, and has a recessed exposed groove 154 for receiving water hose 40h. A hose clamp 156 retains water hose 40h in groove 154 in heat transfer relation with the cast housing. Fuel passage 152 and water hose 40h are in spaced relation separated by the cast housing material therebetween through which the heat is transferred.

Figure 17:
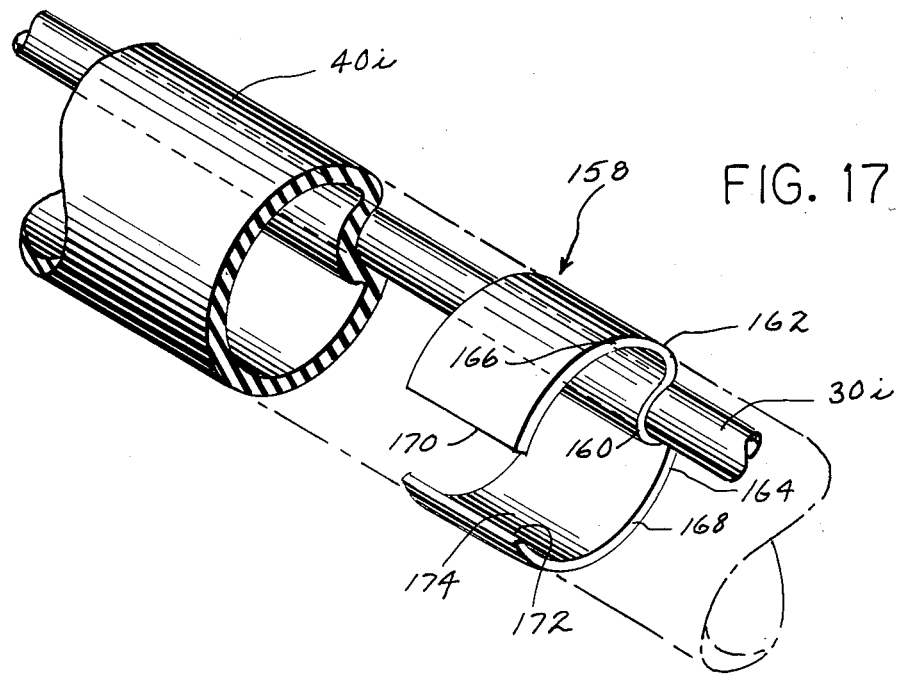
FIG. 17 shows a further embodiment of a fuel line cooler in accordance with the invention.

FIG. 17 shows another embodiment and uses like reference numerals from the above figures where appropriate to facilitate clarity. A clamp is provided by a clip 158 affixed, such as by braising, to fuel line 30i and retaining water hose 40i in snap-in relation and deforming water hose 40i around fuel line 30i in a C-shaped configuration in cross section. Two or more such clips 158 are provided. The clip has a central portion 160 braised to fuel line 30i and extending into oppositely curved portions 162 and 164 curving around and over the hose at 166 and 168 and forming a pair of oppositely facing spring clip legs terminating at facing edges 170 and 172 separated by a gap 174 through which hose 40i is inserted transversely to the axial direction of fuel line 30i.

Figure 18:
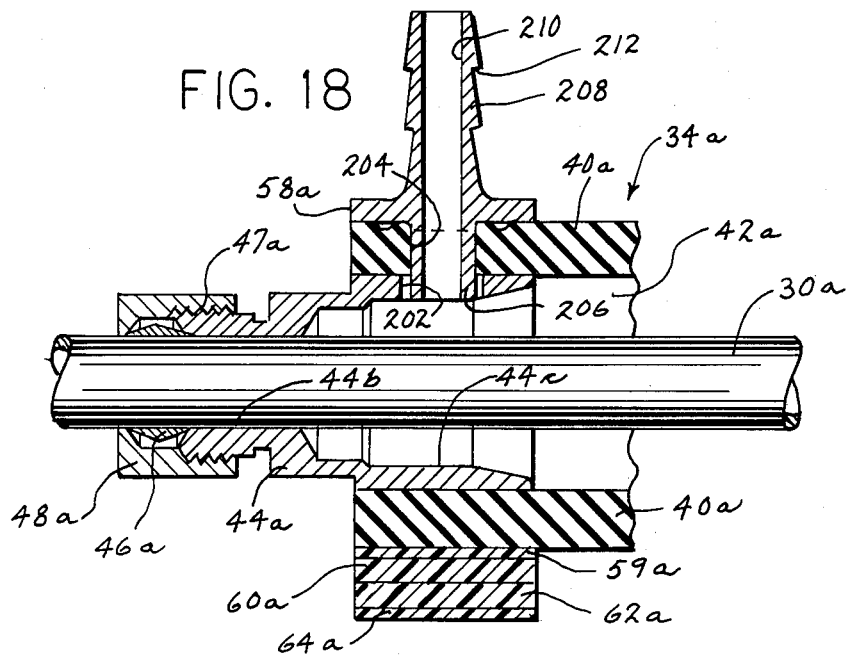
FIG. 18 is a sectional view like FIG. 4 and shows a further clamping arrangement.
Figure 19:
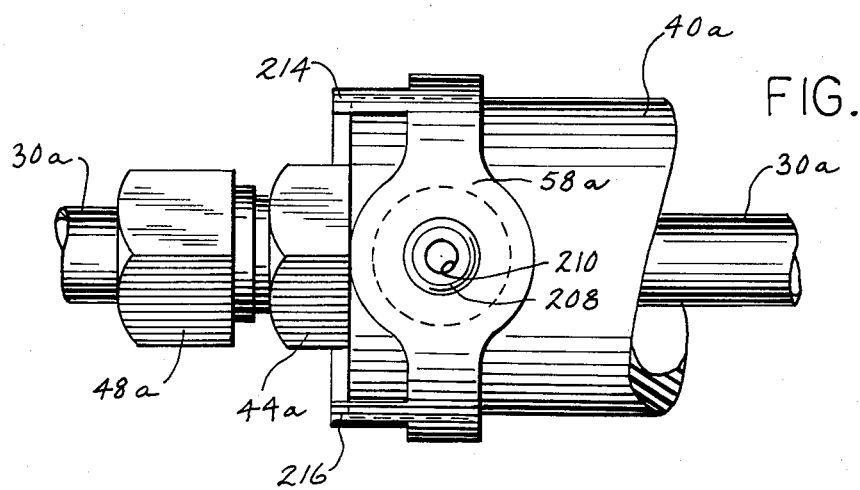
FIG. 19 is a top view of the structure in FIG. 18.
Figure 20:
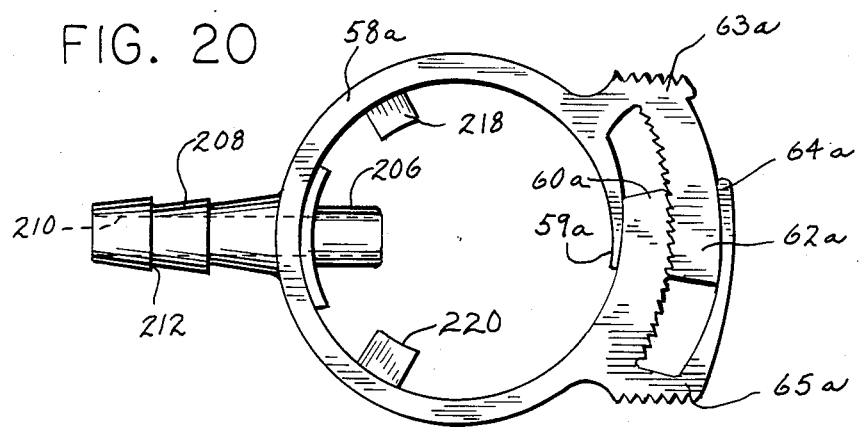
FIG. 20 is an end view of the clamp in FIG. 18.

FIGS. 18–20 show an alternative to the clamping arrangement of FIGS. 3 and 4 and is preferred to facilitate ease of removal and replacement of the water hose. The fuel line cooler 34a includes water hose or conduit 40a concentric to fuel line or conduit 30a and defining an annular space 42a through which cooling water flows in direct contact with the exterior surface of fuel line 30a. Compression ring 46a around fuel line 30a is compressed in sealing relation by compression nut 48a tightened to threaded fitting 44a at threaded interface 47a. Fitting 44a is around fuel line 30a and has a smaller inner diameter portion 44b engaging fuel line 30a adjacent compression ring 46a and inward of threads 47a. Fitting 44a has a larger inner diameter portion 44c radially spaced outwardly from fuel line 30a to define an annular gap coincident with annular space 42a. Portion 44c of fitting 44a has a port 202 therethrough communicating with annular space 42a. Port 202 is an opening extending radially through fitting 44a relative to the axial extent of fuel line 30a. Hose 40a is disposed circumferentially around fitting 44a and has an aperture 204 aligned with opening 202. A clamp 58a is disposed circumferentially around water hose 40a and clamps the hose to fitting 44a. Clamp 58a has mating serrated barbed fingers 60a and 62a, FIG. 20, between inner and outer fingers 59a and 64a. The clamp is closed to a clamped condition by squeezing grip portions 63a and 65a towards each other. The clamp is released to an unclamped condition by pulling finger 64a outwardly to enable the separation of the serrations of fingers 60a and 62a away from each other. The finger portions 59a-65a are like those in the above noted SNP 24 clamp known in the prior art.

Clamp 58a has an inner tubular portion 206 extending radially inwardly through aperture 204 in water hose 40a and through opening 202 in fitting 44a to communicate with annular space 42a. Clamp 58a has an outer tubular portion 208 communicating with inner tubular portion 206 along a common bore 210 therethrough. Tubular portion 208 has an outer barbed configuration as at 212 for connection to water hose 36, FIG. 4, or other fluid carrying conduit. Fitting 44a has an exterior hex configuration for tightening to hex nut 48a, as in FIGS. 3 and 4, at threaded interface 47a.

To facilitate removal and replacement of water hose 40a, one end of fuel line 30a is disconnected from the carburetor or from the fuel pump. Clamp 58a is then released, including withdrawal of inner tubular portion 206 out of opening 202 in fitting 44a and out of aperture 204 in water hose 40a. This enables the water hose 40a to be axially slid off of fitting 44a. The inlet and outlet of water hose 40a have the same clamping arrangements as such as 58a. Hence, in FIG. 18, if the left end of the fuel line is disconnected, water hose 40a is axially slid leftwardly such that the right end of the hose is slid off of the right end fitting, and the entire water hose 40a slides leftwardly past fitting 44a. The new replacement hose is then slide axially rightwardly over fitting 44a and the right end of the new hose engages the right fitting, and the left end of the new hose engages left fitting 44a. In the fitting and clamping arrangement in FIGS. 3 and 4, water hose 40 cannot be axially moved because barbed port 54 is on the fitting, and hence water hose 40 cannot be axially slid therepast.

Clamp 58a has a pair of legs 214 and 216, FIG. 19, extending axially along the outer surface of water hose 40a, and turned radially inwardly at tabs 218 and 220, respectively, FIG. 20, engaging the left axial end of water hose 40a, to locate clamp 58a on the water hose and fitting, particularly providing alignment of inner tubular portion 206 with opening 202 in fitting 44a and with aperture 204 in water hose 40a.

It is recognized that various equivalents, alternatives and modifications are possible within the scope of the appended claims.

We claim:

1. In a marine propulsion system having a water cooled internal combustion engine in a heat-retentive compartment, and including a fuel line in said compartment supplying fuel to a carburetor for combustion by said engine, fuel line cooler means in said compartment in heat transfer relation with said fuel line and separate from and nonintegral with said fuel line, said fuel line cooler means having an inlet communicating with a source of cooling sea water to cool said fuel line and prevent vaporization of said fuel, including the prevention of fuel vaporization after turn-off of said engine by providing a thermally inertial mass in said compartment in heat transfer relation with said fuel to prevent vaporization of said fuel otherwise caused by heat from said engine after turn-off notwithstanding the lower fuel pressure and lower temperature of vaporization of fuel for the carburated said engine as compared to a high pressure fuel injected engine with higher temperatures of fuel vaporization, wherein said fuel line cooler means provides direct contact of said sea water with the exterior of an existing said fuel line.

2. The invention according to claim 1 wherein said existing fuel line extends axially, and said fuel line cooler means comprises a water hose concentric to said existing fuel line and clamping means having a clamped condition sealing said water hose around said existing fuel line and having a released condition enabling said water hose to be axially slid off said fuel line, to facilitate installation and replacement of said water hose.

3. In a marine propulsion system having an internal combustion engine in a heat-retentive compartment, and including a fuel line in said compartment supplying fuel for combustion by said engine, fuel line cooler means comprising means actively cooled during running of said engine, and upon turn-off of said engine providing a thermally inertial mass in said compartment in heat transfer relation with said fuel to prevent vaporization of said fuel otherwise caused by heat from said engine, wherein said fuel line cooler means has an inlet communicating with a source of cooling water for said engine and has an outlet for discharging water and comprising water pump means for pumping cooling water to said engine, wherein said inlet of said fuel line cooler means communicates with said water pump means such that said water pump means pumps cooling water both to said engine and to said fuel line cooler means, wherein said water pump means comprises a sea water pick-up pump for pumping sea water and an engine circulating pump for pumping water through said engine, wherein said inlet of said fuel line cooler means communicates with said sea water pick-up pump such that sea water is pumped through said fuel line cooler means and discharged at said outlet of said fuel line cooler means, and comprising a thermostat housing connected between said sea water pick-up pump and said engine circulating pump, and wherein said inlet of said fuel line cooler means is connected to said thermostat housing, such that the flow path of cooling sea water is from said sea water pick-up pump to said thermostat housing to said engine circulating pump, and such that the flow path of cooling sea water for said fuel line cooler means is from said thermostat housing to said inlet of said fuel line cooler means.

4. In a marine propulsion system having an internal combustion engine in a heat-retentive compartment, and including a fuel line in said compartment supplying fuel for combustion by said engine, fuel line cooler means comprising means actively cooled during running of said engine, and upon turn-off of said engine providing a thermally inertial mass in said compartment in heat transfer relation with said fuel to prevent vaporization of said fuel otherwise caused by heat from said engine, wherein said fuel line cooler means has an inlet communicating with a source of cooling sea water for said engine and has an outlet for discharging water, wherein said engine has a fuel pump pumping fuel to a carburetor for supplying fuel for combustion, and wherein said fuel line cooler means is between said fuel pump and said carburetor and as close as possible to said fuel pump and cools the fuel line downstream of said fuel pump between said fuel pump and said carburetor.

5. In a marine propulsion system having a water-cooled internal combustion engine in a heat-retentive compartment, and includinq a fuel line in said compartment supplying fuel for combustion by said engine, fuel line cooler means in said compartment in heat transfer relation with said fuel line and having an inlet communicating with a source of cooling water and having an outlet for discharging water, said fuel line cooler means comprising a water hose concentric to said fuel line and defining an annular space through which cooling water flows in direct contact with the exterior surface of said fuel line, at least one of said inlet and said outlet of said fuel line cooler means comprising a fitting around said fuel line having a port therethrough communicating with said annular space between said hose and said fuel line, said port comprising an opening extending radially through said fitting relative to the axial extent of said fuel line, said hose being disposed circumferentially around said fitting and having an aperture through said hose aligned with said opening in said fitting, and a clamp around said hose clamping said hose to said fitting, said clamp having an inner tubular portion extending radially inwardly through said aperture in said hose and through said opening in said fitting to communicate with said annular space between said hose and said fuel line, said clamp having an outer tubular portion extending radially outwardly for connection to another water hose.

6. The invention according to claim 5 wherein said clamp is releaseable from said first mentioned hose including withdrawal of said inner tubular portion out of said opening in said fitting and out of said aperture in said first hose, such that said first hose may be slid axially away from said fitting, facilitating removal and replacement of said first hose.

7. The invention according to claim 6 wherein said clamp has at least one leg extending axially along the outer surface of said first hose and having a tab extending radially inwardly from the end of the leg, which tab engages an axial end of said first hose to locate said clamp relative to said first hose and said fitting, including radial alignment of said inner tubular portion of said clamp with said aperture in said first hose and said opening in said fitting.

* * * * *